United States Patent

Garrison et al.

[15] 3,650,789

[45] Mar. 21, 1972

[54] COMPOSITION COMPRISING METAL SALTS AND OCHRA

[72] Inventors: John W. Garrison, Dearborn, Mich.; Charles L. Schlef, University City, Mo.

[73] Assignee: Ford Motor Company, Dearborn, Mich.

[22] Filed: May 29, 1969

[21] Appl. No.: 829,144

[52] U.S. Cl. ....................106/287, 65/30, 106/286, 117/124 B

[51] Int. Cl. ....................G08h 17/24

[58] Field of Search ....................65/30, 33, 116, 60; 106/313, 106/286, 34, 287; 117/124 B

[56] References Cited

UNITED STATES PATENTS

| | | | |
|---|---|---|---|
| 2,662,035 | 12/1953 | Levi | 65/60 X |
| 3,249,467 | 5/1966 | Stookey | 65/60 X |
| 2,662,036 | 8/1953 | Levi | 106/34 X |
| 2,175,115 | 3/1939 | Gardner | 106/34 X |
| 3,519,474 | 7/1970 | Bopp | 117/124 |

FOREIGN PATENTS OR APPLICATIONS

| | | | |
|---|---|---|---|
| 1,324,728 | 3/1963 | France | 65/30 |

*Primary Examiner*—Theodore Morris
*Attorney*—John R. Faulkner and William E. Johnson

[57] ABSTRACT

This invention relates to a glass coating composition containing silver nitrate, cuprous chloride, potassium chloride barium carbonate and ochre.

2 Claims, No Drawings

A COMPOSITION COMPRISING METAL SALTS AND OCHRA

BACKGROUND OF THE INVENTION

Recently in the automotive industry, an electrically heated backlight has been introduced for removing fog and ice from the backlight when such materials develop thereon. In particular, individual ones of these heated backlights comprise a plurality of metallic circuit paths extending across the length of the backlight. The circuit paths are connected at opposite ends to common bus bars and thus to the electrical system of the vehicle. When the backlight heating is desired, the electrical circuit to the backlight is actuated. The electrical energy flowing through the circuit paths formed on the backlight produce sufficient heat to cause either a defogging or a deicing of the backlight within a short period of time.

At the present time, the metallic circuit paths on some of the heated backlights are applied by a silk screening operation in which a paste is used that is formed of 60 to 90 percent silver with the remainder glass frit. After a circuit pattern of this type of material is deposited in the silk screening process, the backlight is fired and the glass frit bonds the metallic particles to the glass thereby providing the conductive circuit paths on the backlight. This type of processing for producing such a heated backlight is expensive.

A more advantageous method of producing a heated backlight, or other devices as, for example, a printed circuit pattern on a glass substrate, is by means of a method in which particular areas of the glass sheet would be sensitized directly for reception of a metal plating thereon. In such a method, the glass would first be sensitized for reception of a metal plating and thereafter metal plated with the desired metals to produce the article.

SUMMARY OF THE INVENTION

This invention relates to a composition and a method for sensitizing the surface of a glass article and also to the article produced by the method.

The composition for sensitizing the surface of the glass article includes various portions of silver nitrate, cuprous chloride, potassium chloride, barium carbonate and ochre. The method of sensitizing the surface of the glass includes the steps of applying the sensitizing composition to the surface of the glass in the area to be sensitized and then firing the glass until the composition reacts with the glass surface. The fired glass is thereafter washed to remove the excess sensitizing composition. The sensitized areas of the glass article are then plated in an electroless plating bath to place a thin metal coat thereon, and thereafter plated in a standard electroplating process to place any desired metal coating on the thin metal coat. The product produced by the above described process is unique in that it will receive the metal plate thereon only in the sensitized areas and will receive the metal plate in a uniform manner.

DESCRIPTION OF THE PREFERRED EMBODIMENT

The purpose of this invention is to provide a composition and a method for sensitizing the surface of a glass article for the reception of a metal plating thereon in the sensitized surface area of the glass. For example, the composition of this invention may be utilized to sensitize the surface area of a glass template shaped to form the backlight of an automobile vehicle so that a circuit grid may be placed on the backlight for defogging and deicing purposes. In such a case, the circuit grid on the backlight would be one which would provide a plurality of horizontal bands across the backlight between a pair of vertical bus bars at opposite ends of the bands. The bus bars would be connected to the electrical system of the vehicle by a suitable circuit to permit the conducting of current through the bands to heat the backlight when the circuit is actuated, thereby to defog and/or to deice the backlight.

In accordance with the teachings of this invention, a composition for sensitizing the surface of a soda glass for the reception of a metal plating thereon includes the following components therein:

| | |
|---|---|
| Silver Nitrate | 40 to 60 grams |
| Cuprous Chloride | 200 to 260 grams |
| Potassium Chloride | 160 to 190 grams |
| Barium Carbonate | 600 to 700 grams |
| Ochre | 600 to 800 grams |

Pine oil and turpentine are added to the above composition to make a slurry with suitable viscosity for application by either a silk screening process or a spraying process.

The surface of a glass article to be treated has the sensitizing composition applied thereto, as for example, in a silk screening operation. The desired article may, for example, be a heated backlight and the pattern of material applied to the glass would be as previously described. The glass article with the pattern of material is fired with the composition thereon until the composition reacts with the surface of the glass to sensitize the same. Generally, the firing takes place at a temperature of 1,050° to 1,250° F. for a period of 10 to 20 minutes.

After firing, the glass article is cooled to an ambient temperature. The excess sensitizing composition is washed off and the glass now has a sensitized pattern on the surface area thereof. After washing, a metal plate, such as a copper plate, is placed on the sensitized areas of the glass by an electroless copper plating process such as by a copper tartrate formaldehyde plating bath. The sensitized areas must be first treated by an electroless plating process. After the electroless plating process has placed a thin metal layer on the sensitized area of the glass, the pattern on the glass can be metal plated by an electroplating process.

The specific components of the sensitizing composition are critical. Also, it has been found that any change in the specific components described results in a poor quality metal plating and mainly in failure to sensitize the glass surface for reception of the metal plate.

Also, the compositional ranges set forth hereinabove are critical in nature. If the compositional ranges are exceeded or, in the alternative, not reached, the sensitizing of the glass does not permit a proper metal plate to be applied. Slight variations from the exact composition ranges do not greatly affect the plating, but any substantial variation does, in fact, impede or totally ruin the metal plating process.

We claim:

1. A composition which, on a proportional basis, consisting essentially of:

| | |
|---|---|
| Silver Nitrate | 40 to 60 grams |
| Cuprous Chloride | 200 to 260 grams |
| Potassium Chloride | 160 to 190 grams |
| Barium Carbonate | 600 to 700 grams |
| Ochre | 600 to 800 grams. |

2. The composition of claim 1 wherein: sufficient pine oil and turpentine is added to make a slurry suitable for either a silk screen or a spraying operation.

* * * * *